US012596330B2

(12) United States Patent
Hyde et al.

(10) Patent No.: US 12,596,330 B2
(45) Date of Patent: Apr. 7, 2026

(54) DATE DISPLAY DEVICE

(71) Applicant: Montres Breguet S.A., L'Abbaye (CH)

(72) Inventors: Peter Hyde, Le Sentier (GB); Marc Stranczl, Nyon (CH); Lionel Matthey-De-L'Endroit, Cheseaux-sur-Lausanne (CH); René Piguet, St-Livres (CH)

(73) Assignee: Montres Breguet S.A., L'Abbaye (CH)

( * ) Notice: Subject to any disclaimer, the term of this patent is extended or adjusted under 35 U.S.C. 154(b) by 298 days.

(21) Appl. No.: 18/301,546

(22) Filed: Apr. 17, 2023

(65) Prior Publication Data

US 2023/0408980 A1 Dec. 21, 2023

(30) Foreign Application Priority Data

Jun. 20, 2022 (EP) .................................... 22179924

(51) Int. Cl.
*G04B 19/16* (2006.01)

(52) U.S. Cl.
CPC .................................. *G04B 19/166* (2013.01)

(58) Field of Classification Search
CPC .. G04B 19/166; G04B 19/24; G04B 19/2432; G04B 19/163
See application file for complete search history.

(56) References Cited

U.S. PATENT DOCUMENTS 2,583,797 A * 1/1952 Rosfelder ............ G04B 19/046 968/145
2,635,357 A * 4/1953 Whitlock ............... G09B 19/12 434/304
2,690,801 A * 10/1954 Perl ........................ G04C 23/02 968/606
4,551,027 A * 11/1985 Spruck ................... G04B 19/26 368/17
4,632,569 A * 12/1986 Gogniat ............... G04B 19/046 968/145
4,759,022 A * 7/1988 Akerberg ............. G08B 3/1016 340/7.52

(Continued)

FOREIGN PATENT DOCUMENTS

CH 660 663 A3 6/1987
EP 2 713 226 A2 4/2014

OTHER PUBLICATIONS

European Search Report for 22 17 9924, dated Nov. 29, 2022.

*Primary Examiner* — Sean Kayes
(74) *Attorney, Agent, or Firm* — Sughrue Mion, PLLC

(57) ABSTRACT

A date display device (10) including: a dial (11) including date indications in the form of a character scale (15), of which a part is of apertures (150), a mobile index (12) with respect to the dial (11); a date mechanism configured to move the index (12) by one step per day, such that each position occupied by the index (12) denotes one of the characters (15); and a mobile element (13) arranged between the dial (11) and the date mechanism having on a surface facing the dial, a portion of interest (131), the mobile element being linked with the date mechanism such that the latter drives it in an active position, wherein the portion of interest is visible through the aperture (150) and in a rest position wherein the portion of interest is set back from the aperture and wherein a marking zone (160) is visible through the aperture.

13 Claims, 3 Drawing Sheets

(56) References Cited

U.S. PATENT DOCUMENTS

| | | | | |
|---|---|---|---|---|
| 6,646,958 | B1 * | 11/2003 | Geiger | G04B 47/003 368/10 |
| 8,830,797 | B2 * | 9/2014 | Dubugnon | G04B 19/25353 368/232 |
| 2003/0112707 | A1 * | 6/2003 | Berard | G04B 19/24 368/28 |
| 2014/0086019 | A1 * | 3/2014 | Le Doussal | G04B 19/262 368/17 |

* cited by examiner

Fig. 1c Sectional plane A-A

Fig. 2c Sectional plane B-B

Fig. 3c Sectional plane C-C

Fig. 4c Sectional plane D-D

DATE DISPLAY DEVICE

CROSS REFERENCE TO RELATED APPLICATIONS

This application claims priority to European Patent Application No. 22179924.0 filed Jun. 20, 2022, the entire contents of which are incorporated herein by reference.

TECHNICAL FIELD OF THE INVENTION

The invention relates to the field of watchmaking, and particularly that of the display of time indications of a timepiece, particularly a watch.

More specifically, the invention relates to a date display device.

TECHNOLOGICAL BACKGROUND

Among date display devices, there are those which make it possible to indicate the current date via a mobile index, typically a hand, moving on a watch dial, with respect to a scale of characters produced on said dial and distributed uniformly along a circle or an arc of a circle. The characters are representative of dates.

The hand is moved by a suitable date mechanism, well-known to a person skilled in the art, engaged with the hour wheel, so as to jump each day in order to indicate a new date.

This date mechanism can be retrograde. Indeed, it drives the hand in an opposite direction once it has travelled over all of the dates of a month, in order to indicate the first date of the next month.

Date display devices are particularly described in detail in the publication "les montres compliquées" by François Lecoultre, published by Editions Simonin.

This type of date display device has limitations, for example in respect of readability and information provided.

The aim of the present invention is that of increasing the aesthetic appeal of mobile-index date display devices, and particularly of facilitating the use thereof by displaying additional information with respect to display devices of the prior art.

SUMMARY OF THE INVENTION

The invention solves the drawbacks mentioned above by proposing a date display device including:

- a dial comprising date indications in the form of a character scale, of which at least a part is in the form of apertures,
- a mobile index with respect to the dial,
- a date mechanism configured to move the index by one step per day, such that each position occupied by said index denotes one of the characters, and
- a mobile element arranged between the dial and the date mechanism having on all or part of a surface disposed facing said dial, a portion of interest, said mobile element being kinematically linked with the date mechanism such that the latter is capable of driving it in an active position wherein the portion of interest is visible through at least one predetermined aperture and in a rest position wherein the portion of interest is set back from said at least one predetermined aperture and wherein a marking zone is visible through said predetermined aperture.

In specific embodiments, the invention can further include one or more of the following features, which must be considered singly or according to any combination technically possible.

In specific embodiments, the portion of interest has an identical appearance to that of an outer surface of the dial so as to remove from the user's view the character formed by the aperture through which the portion of interest is visible when the mobile element occupies the active position.

In specific embodiments, the marking zone is arranged facing at least the apertures forming the characters representing the dates 29 to 31 when the mobile element occupies the rest position, the portion of interest having a different appearance from that of the dial and said marking zone, so as to show the characters representing the dates 29 to 31 when the mobile element occupies the active position.

In specific embodiments, the mobile element includes on a top surface, in addition to the portion of interest, a surface portion capable of being visible through one or more apertures corresponding to all or part of the marking zone, said marking zone of the mobile element having a different appearance from that of the portion of interest.

In specific embodiments, the characters are distributed along at least an arc of a circle, the index being mobile with respect to the dial, the mobile element being visible through the apertures and having an axis of rotation merged with that of the index.

In specific embodiments, the marking zone and the portion of interest are distributed along the mobile element such that, when the latter occupies the rest position, the marking zone is arranged facing all of the apertures, and such that when the mobile element occupies the active position, the marking zone is arranged facing some of the apertures, the portion of interest being arranged facing the other apertures.

In specific embodiments, the mobile element has a closed annular form, the marking zone and the portion of interest each being formed by a set of sectors arranged alternately following each other such that two successive characters have a different appearance from one another.

In specific embodiments, the mobile element includes, on the top surface thereof, an additional sector of different appearance from those forming the marking zone and the portion of interest, said additional sector being inserted between two sectors having a different appearance from the appearance of said additional sector such that the latter forms the index.

In specific embodiments, the sectors between which the additional sector is arranged have a different colour from that of the marking zone and the portion of interest.

In specific embodiments, the display device comprises an extra thickness whereon the marking zone is produced and arranged so as to be visible through all of the apertures forming the characters representing the dates 1 to 28, said extra thickness and the mobile element being arranged adjacently and having a thickness such that the top surface of said mobile element and the visible surface of said extra thickness extend substantially in the same plane.

In specific embodiments, the mobile element has the form of a lever, the date mechanism including a cam on the profile of which the lever is arranged in support such that said cam, during the rotation thereof, pivots said lever between the active position thereof and the rest position thereof.

In specific embodiments, the display device comprises two mobile elements of which one has a closed annular form and of which the other has the form of a lever.

In specific embodiments, the dial is made of transparent material and includes, on the surface thereof facing the date mechanism, an opaque thin coat, the apertures being made of said thin coat.

BRIEF DESCRIPTION OF THE FIGURES

Other features and advantages of the invention will become apparent upon reading the following detailed description given by way of a non-limiting example, and with reference to the accompanying drawings, wherein:

FIG. 1*c* schematically represents a sectional view along the sectional plane A-A of the device of FIG. 1*b;*

FIG. 2*c* schematically represents a sectional view along the sectional plane B-B of the device of FIG. 2*b;*

FIG. 3*c* schematically represents a sectional view along the sectional plane C-C of the device of FIG. 3*b;*

FIG. 4*c* schematically represents a sectional view along the sectional plane D-D of the device of FIG. 4*b;*

Figure 1A:
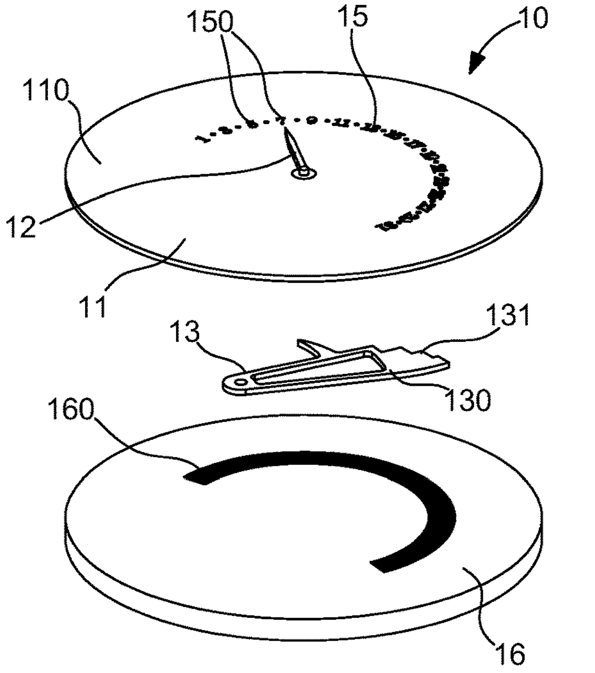
FIG. 1*a* represents an exploded perspective view of a date display device according to an embodiment example of the invention.

It should be noted that the figures are not necessarily drawn to scale for clarity purposes.

DETAILED DESCRIPTION OF THE INVENTION

As shown schematically in FIGS. 1*a* to 6, the present invention relates to a date display device 10 including a dial 11 of a timepiece, for example a watch, having date indications, a rotatable index 12 with respect to the dial 11 intended to indicate the current date, and a mobile element 13 intended to cause a change of appearance of one or more date indications.

In all of the embodiment examples described hereinafter, the date indications are arranged in the form of a scale of thirty-one characters 15, for example distributed along an arc of a circle, of which at least a part is in the form of apertures 150, as seen in FIGS. 1*a*, 1*c*, 2*a*, 2*c*, 3*a*, 3*c*, 4*a*, 4*c*, 5*a* and 5*c*. It should be noted that, when the surface visible through the apertures 150 has a different appearance from that of the visible surface of the dial 11, the characters 15 formed by the apertures 150 are visible for a user, and when the surface visible through the apertures 150 has an identical appearance to that of the visible surface of the dial 11, the characters 15 are hidden from the user's view. The visible surface of the dial 11 is the surface of an outer face 110.

In the embodiment examples represented in FIGS. 1*a* to 4*c*, the characters 15 representing the dates 1 to 28 have a constant appearance and the characters 15 representing the dates 29 to 31 have a variable appearance according to the duration of the current month.

Figure 1B:
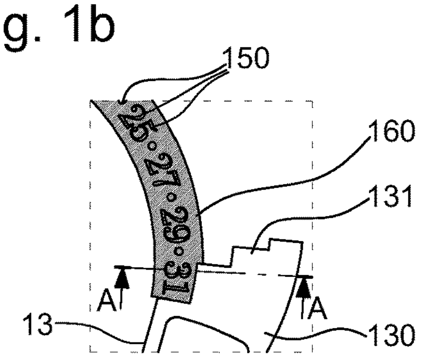
FIG. 1*b* schematically represents a top view of a detail of the device of FIG. 1*a;*
Figure 1B:
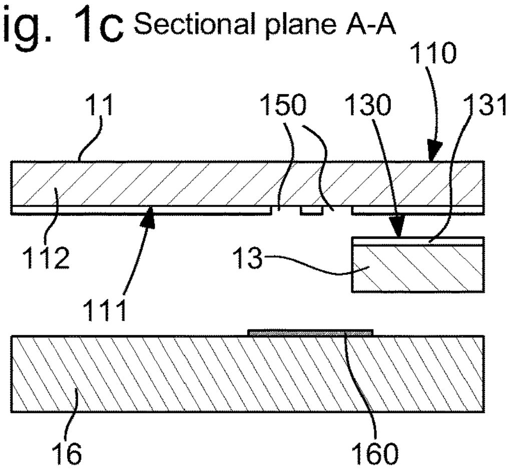
Figure 2A:
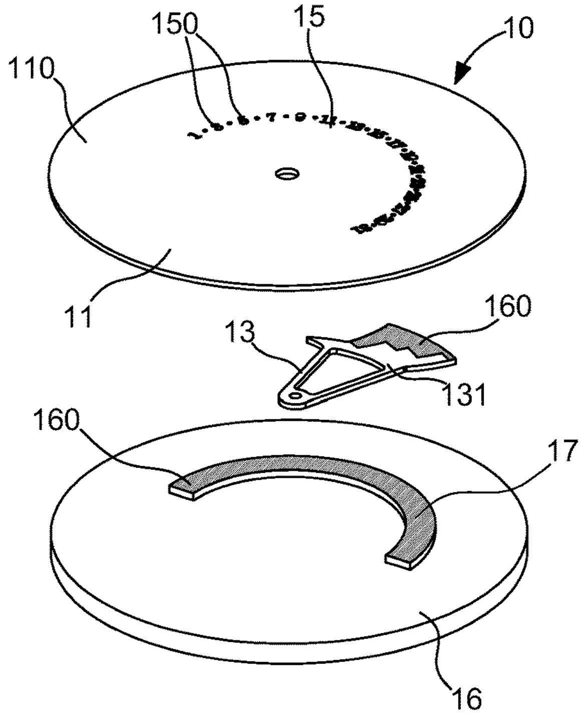
FIG. 2*a* represents an exploded perspective view of a date display device according to another embodiment example of the invention.
Figure 3B:
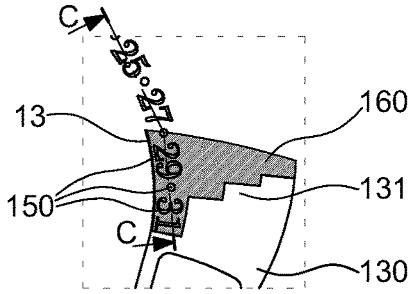
FIG. 3*b* schematically represents a top view of a detail of the device of FIG. 3*a;*
Figure 3B:
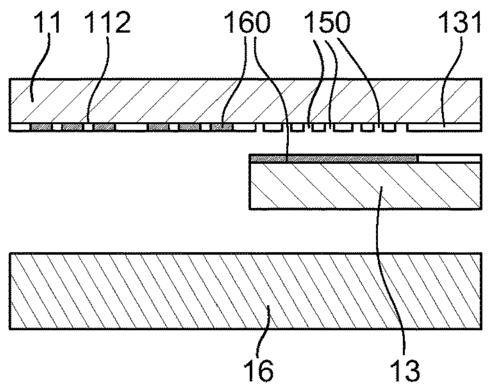
Figure 4A:
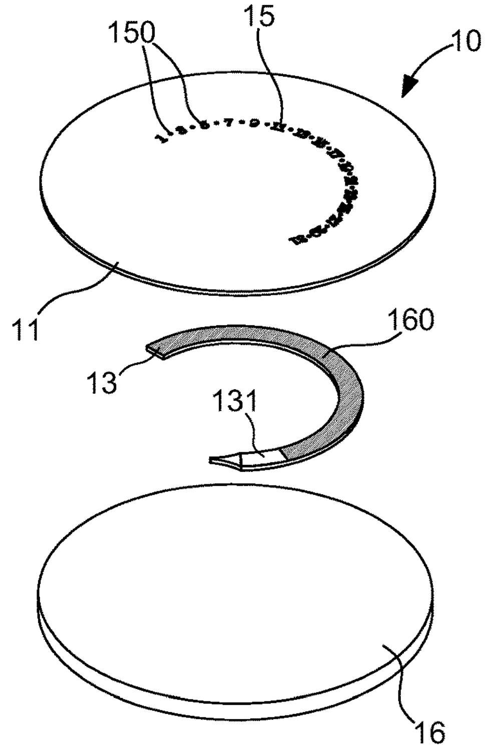
FIG. 4*a* represents an exploded perspective view of a date display device according to a further embodiment example of the invention.

The characters 15 representing the dates 1 to 28 can be formed by apertures 150 showing a marking zone 160 for example made of a thin coat, as illustrated by FIGS. 1*a*, 2*a* and 4*a*. Moreover, the marking zone 160 and the mobile element 13 are transparently visible in FIGS. 1*b*, 2*b*, 3*b* and 4*b* to facilitate the understanding of the invention. However, it should be noted that this marking zone 160 is only normally visible through the apertures 150, the thin coat 112 being opaque. As described in detail hereinafter, according to the embodiment example considered, the mobile element 13 can optionally include a marking zone 160.

Moreover, the index 12 is mobile, for example in rotation about an axis concentric with the arc of a circle along which the characters 15 are distributed. In the embodiment examples represented in the figures, the index 12 is formed by a hand.

Preferably, as shown in FIGS. 1*c*, 2*c*, 3*c* and 4*c*, the dial 11 is made of transparent material, for example of sapphire and of glass, and includes, on the surface of an inner face 111, an opaque thin coat 112, the apertures 150 being preferably made of said thin coat 112.

The date display device 10 according to the invention includes an annual or perpetual date mechanism (not shown in the figures) configured to move the index 12 by one step per day, such that each position occupied by said index 12 denotes one of the characters 15 corresponding to the current day's date. Such a date mechanism is well-known to a person skilled in the art, it is therefore not described in detail hereinafter. In a manner also known per se, when moving onto the next month, the index 12 is driven from date of the last day of the month, for example 28, 29, 30 or 31, to the date of the beginning of the month, by the annual or perpetual date mechanism. The inner face 111 is arranged facing the date mechanism.

This date mechanism is part of a horological movement 16 represented schematically in FIGS. 1*a*, 1*c*, 2*a*, 2*c*, 3*a*, 3*c*, 4*a* and 4*c*.

In the embodiment examples represented in the figures, the dial 11 is superposed on a plate of the horological movement 16 and the mobile element 13 is inserted between said dial 11 and said plate.

Advantageously, the mobile element 13 is arranged between the dial 11 and the date mechanism is present on all or part of a surface disposed facing said dial 11, referred to as "top surface" 130, a portion of interest 131 having a different appearance from that of the marking zone 160. The portion of interest 131 can consist of a thin coat deposited on the mobile element 13, as shown in FIGS. 1*c*, 2*c*, 3*c* and 4*c*.

The mobile element 13 is kinematically linked with the date mechanism such that the latter is capable of driving said mobile element 13 in an active position wherein the portion of interest 131 is visible through at least one predetermined aperture 150 and in a rest position wherein the portion of interest 131 is arranged set back from said at least one predetermined aperture 150.

In the embodiment examples represented in FIGS. 1*a* to 4*c*, when the mobile element 13 occupies the active position, the portion of interest 131 is arranged facing one or more apertures 150 forming characters 15 representing dates capable of being variable between two successive months, i.e. the dates 29 to 31. In other words, the active position of the mobile element 13 can be defined by several angular positions thereof. To this end, as shown in FIGS. 1*a*, 1*b*, 2*a*, 2*b*, 3*a* and 3*b*, the portion of interest 131 can be delimited by a stepped profile in order to be visible facing one or more apertures 150 according to the angular position thereof when it occupies the active position.

For example, the portion of interest 131 can have a different colour from that exhibited by the marking zone 160, and in particular, it can have an identical colour to that of the dial 11. This feature has the effect of hiding the characters 15 facing which the portion of interest 131 is arranged when the mobile element 13 occupies the active position.

Alternatively, if the portion of interest 131 has a different colour from that of the dial 11 and from that of the surface visible through the apertures 150 when the mobile element 13 occupies the rest position, the character(s) 15 formed by the apertures 150 through which said portion of interest 131 is visible when the mobile element 13 occupies the active position are shown with respect to the other characters 15.

Thus, thanks to the invention, according to the portion of interest 131, the variable dates can be hidden, or on the contrary, shown with respect to the rest of the dates, i.e. with respect to the dates 1 to 28, according to the number of days of the current month. In other words, the dates 29, 30 and/or 31 can be hidden or shown during the months with less than thirty-one days, such that the user can identify the number of days of the current month.

In the embodiment example represent in FIGS. 1*a* to 1*c*, the mobile element 13 has only a portion of interest 131 visible through one or more apertures 150 when the mobile element 13 occupies the active position. Moreover, the marking zone 160 is embodied by a thin coat deposited on the plate of the horological movement 16, facing all of the apertures 150 forming the characters 15 representing the dates 1 to 31.

Unlike the embodiment example represented in FIGS. 1*a* to 1*c*, in the embodiment examples represented in FIGS. 2*a* to 3*c*, the mobile element 13 includes two surface portions capable of being visible through one or more apertures 150. One of these portions corresponds to a part of the marking zone 160 and the other portion corresponds to the portion of interest 131.

Figure 2B:
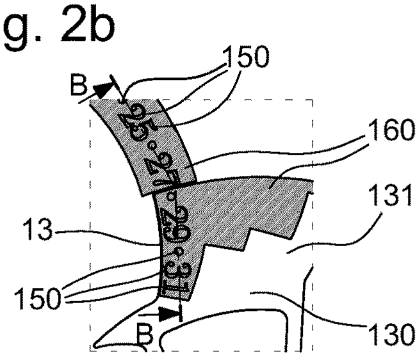
FIG. 2*b* schematically represents a top view of a detail of the device of FIG. 2*a;*
Figure 2B:
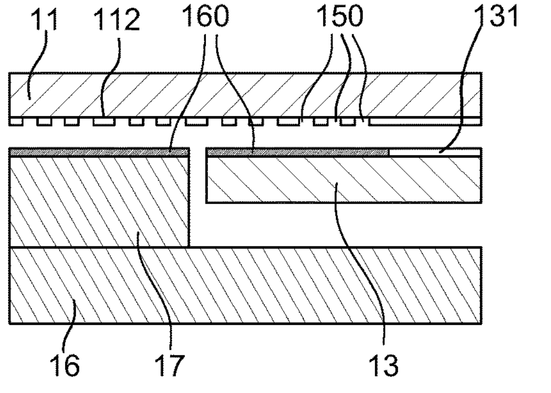
Figure 3A:
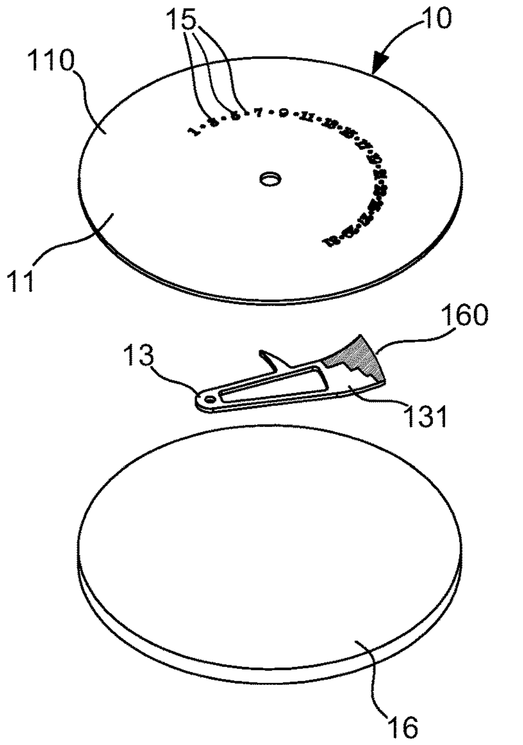
FIG. 3*a* represents an exploded perspective view of a date display device according to a further embodiment example of the invention.
Figure 4B:
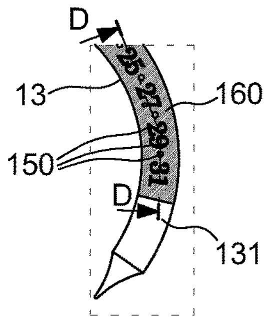
FIG. 4*b* schematically represents a top view of a detail of the device of FIG. 4*a;*
Figure 4B:
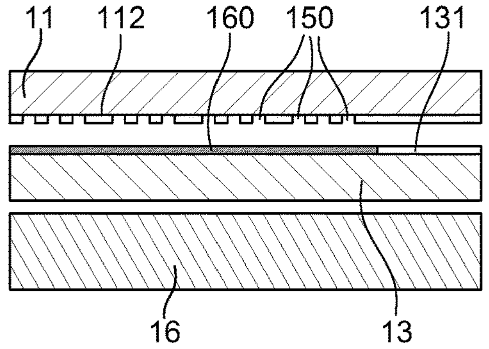

In particular, as illustrated in FIGS. 2*b*, 3*b* and 4*b*, the mobile element 13 is configured such that, when it occupies the rest position, the part of the marking zone 160 that it shows is arranged facing at least of the set of characters 15 representing the dates 29 to 31.

In order to improve the perceived quality of the date display, the device 10 can include an extra thickness 17, as illustrated in FIGS. 2*a* and 2*c*, fastened to the plate of the horological movement 16 and whereon the marking zone 160 is embodied such that it is visible through the set of apertures 150 forming the characters 15 representing the dates 1 to 28. The mobile element 13 and the extra thickness 17 are arranged adjacently to each other and has a thickness such that the surfaces of said extra thickness 17 and the mobile element 13 visible through the set of apertures 150 extend in the same plane.

Alternatively, the marking zone 160 can be deposited directly on the inner face 111 of the dial 11 in order to form the characters 15 representing for example the dates 1 to 28, as shown by FIGS. 3*a* to 3*c*. In this embodiment example, the apertures 150 are only made to form the characters 15 representing at least the dates 29 to 31.

Also alternatively, in the embodiment example represented in FIGS. 4*a* to 4*c*, the marking zone 160 is entirely embodied on the mobile element 13.

More specifically, in this embodiment example, the mobile element 13 has an open annular form and is rotatable about an axis merged with that of the index 12. The mobile element 13 is visible through the set of apertures 150. In other words, when it occupies the rest position, the marking zone 160 is visible through all the apertures 150, and when it occupies the active position, the second portion is visible through one or more apertures 150 forming the characters 15 representing one or more of the dates 29 to 31, the rest of the apertures 150 showing said marking zone 160.

In the embodiment examples represented in FIGS. 1*a* to 3*c*, the mobile element 13 is formed by a lever.

In all of the embodiment examples represented in FIGS. 1*a* to 4*c*, the mobile element 13 is arranged in support by a free end against a profile of a cam (not shown in the figures) included in the date mechanism such that said cam, during the rotation thereof, pivots said mobile element 13 between the active position thereof and the rest position thereof.

More specifically, the cam is rotated by a twelfth of a turn per month by a dedicated geartrain, and the profile thereof includes several portions having different radii, of which portions intended to receive the mobile element 13 in support so that it occupies the rest position, and of which portions intended to receive the mobile element 13 in support so that it occupies different angular positions representative of the active position thereof.

The objective in these embodiment examples according to the invention is that of moving the mobile element 13 so as to display the date number corresponding to the number of days of the current month.

Figure 5A:
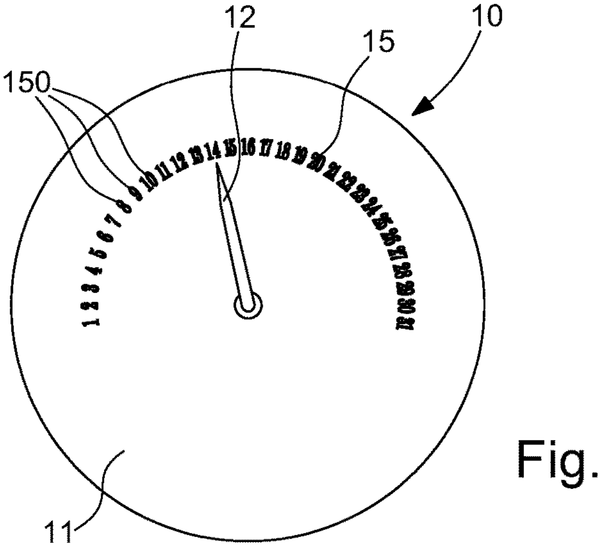
FIG. 5*a* represents a schematic top view of a dial of a date display device according to a further embodiment example of the invention, with no mobile element, the dial comprising date indications of which one is denoted by an index in the form of a hand.
Figure 5C:
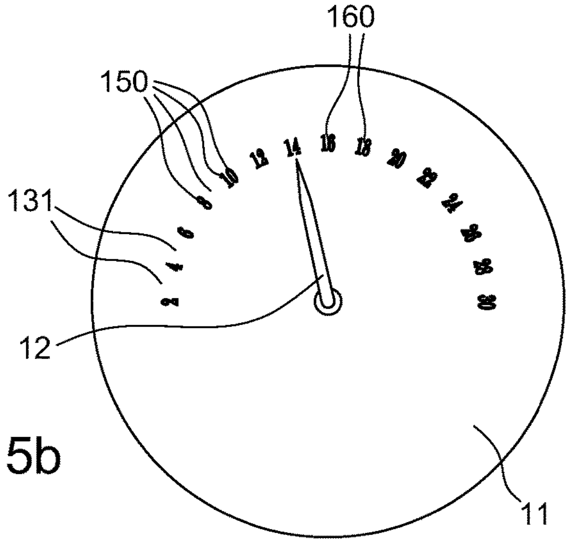
FIG. 5*c* schematically represents a top view of the dial of FIG. 5*a* with which the mobile element of FIG. 5*b* cooperates.
Figure 5B:
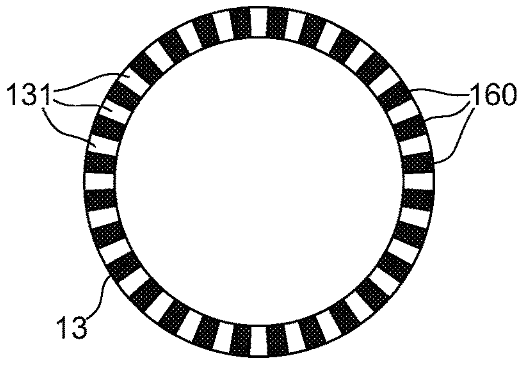
FIG. 5*b* schematically represents a top view of a mobile element intended to integrate the device of FIG. 5*a;*

Alternatively, the mobile element 13 can have a closed annular form, as represented in FIG. 5*b* in another embodiment example. The portion of interest 131 and the marking zone 160 of the mobile element 13 each include a plurality of sectors. The sectors of said portion of interest 131 and of said marking zone 160 are arranged alternately following each other and each sector is dimensioned so as to be disposed facing a character 15. Thus, two successive characters 15 have a different appearance from one another, as seen in FIG. 5*c*.

In this embodiment example of the invention, the mobile element 13 is configured to be driven by the date mechanism by one step per day, one step corresponding to an angular value separating two successive apertures 150.

The display device 10 can thus, according to the appearance of the portion of interest 131, show or hide the characters 15 representing even or odd dates, depending on whether the current day's date is even or odd. This feature advantageously helps facilitate the reading of the dates and in particular of the current day's date.

For example, the mobile element 13 can include an inner or outer toothing kinematically linked with a finger of an index driving wheel 12. In other words, in this embodiment example, the mobile index 13, is preferably rigidly connected in rotation to the index 12.

In summary, the objective in this embodiment example is that of moving the mobile element 13 so as to display only even or odd dates, depending on whether the current day's date is even or odd.

In this embodiment example, the characters 15 are preferably formed by a series of digits from 1 to 31. Advantageously, the present invention enables easy reading of these characters 15, even if they are arranged at a very short distance from one another, as seen by way of comparison in FIG. 5*a*, wherein the mobile element 13 is not represented, and FIG. 5*c* wherein the mobile element 13 is represented.

It should be noted that here, the mobile element 13 occupies the active position and the rest position in alternation, relative to a given aperture.

Advantageously, the mobile element 13 can furthermore include an additional sector of different appearance from those of the marking zone 160 and the portion of interest 131, inserted between two sectors of said marking zone 160, between two sectors of said portion of interest 131, or between two other sectors identical to one another but of different appearance from that of said additional sector. This additional sector is dimensioned so as to be able to be visible only through a single aperture 150 and makes it possible to form the index 12, and thus be able to do away with the need for a hand or any other index formed by an additional part. The additional sector is therefore visible by a user through the aperture 150 forming the character 15 representing the current day's date.

Alternatively, it can be envisaged that the marking zone 160 of the mobile element 13 forms a sector visible through only one of the apertures 150 so as to indicate the current day's date, the portion of interest 131 defining two sectors extending on either side of said marking zone 160 so as to be visible through all of the apertures 150 except for the aperture through which the sector of the marking zone 160 is visible.

In this embodiment example not shown in the figures, the index 12 consists of said single sector formed by the marking zone 160. The user can thus identify the current day's date simply and quickly on the dial 11.

Figure 6:
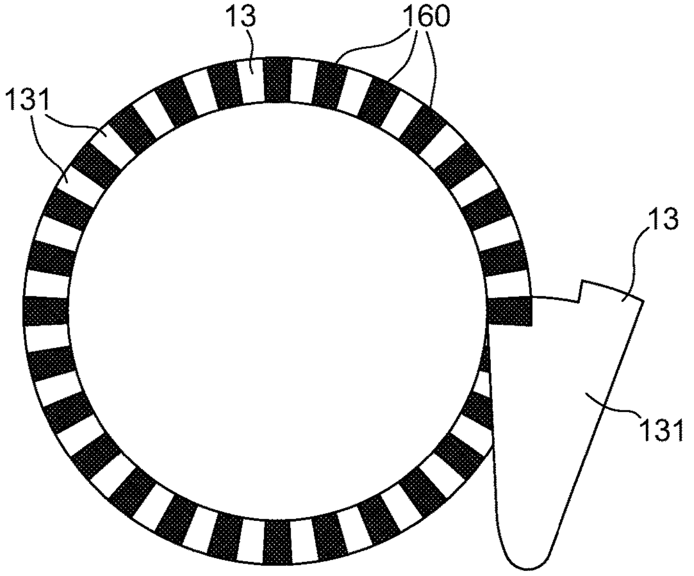
FIG. 6 schematically represents a combination of two mobile elements of a date display device according to a further embodiment example of the invention, said mobile elements complying respectively with that of one of FIGS. 1*a* to 3*c* and with that of FIG. 5*b*.

As shown in FIG. 6 in another embodiment example of the invention, the display device 10 can include two mobile elements 13 of which one has a closed annular form, similar for example to the mobile element 13 described above in the embodiment example represented in FIG. 5*b*, and of which the other has the form of a lever, similar for example to the mobile element 13 described above in the embodiment example represented in FIG. 1*a*.

In this embodiment example of the invention, the operations of the mobile elements 13 are identical to the operations of those described respectively in the description of the embodiment examples represented in FIGS. 1*a* and 5*a* to 5*c*, such that this example of a display device makes it possible to benefit from the combination of the advantages thereof.

More generally, it should be noted that the implementations and embodiments considered above have been described by way of non-limiting examples, and that other alternatives are thus possible.

In particular, in the embodiment examples represented in FIGS. 1*a*, 2*a*, 3*a*, 4*a* and 5*a*, the character scale 15 extends along an arc of a semicircle. It goes without saying that the character scale 15 can extend along an arc of a circle forming a more or less substantial angle.

The invention claimed is:

1. A date display device, comprising:
- a dial including date indications in the form of a character scale, of which at least a part is in the form of apertures,
- a mobile index configured to move with respect to the dial such that each position occupied by said mobile index corresponds to one of the characters of the date indications, and
- a mobile element arranged behind the dial having a portion of interest on at least part of a top surface disposed facing said dial, said mobile element being kinematically driven between an active position in which the portion of interest is visible through at least one of the apertures and a rest position in which the portion of interest is set back from said at least one of the apertures and a marking zone is visible through said at least one of the apertures.

2. The display device according to claim 1, wherein the portion of interest has an identical appearance to that of an outer surface of the dial so as to remove from a user's view the character formed by the aperture through which the portion of interest is visible when the mobile element occupies the active position.

3. The display device according to claim 1, wherein the marking zone is arranged facing at least the apertures corresponding to a first set of characters when the mobile element occupies the rest position, the portion of interest having a different appearance from that of the dial and said marking zone, so as to show the first set of characters when the mobile element occupies the active position.

4. The display device according to claim 1, wherein the mobile element includes on the surface facing the dial, in addition to the portion of interest, a surface portion capable of being visible through one or more of the apertures that correspond to all or part of the marking zone, said marking zone of the mobile element having a different appearance from that of the portion of interest.

5. The display device according to claim 4, wherein the characters are distributed along at least an arc of a circle, the mobile index is mobile with respect to the dial, and the mobile element is visible through the apertures and having an axis of rotation merged with that of the mobile index.

6. The display device according to claim 5, wherein the marking zone and the portion of interest are distributed along the mobile element such that, when the mobile object occupies the rest position, the marking zone is arranged facing all of the apertures, and when the mobile element occupies the active position, the marking zone is arranged facing some of the apertures and the portion of interest is arranged facing apertures other than the some of the apertures.

7. The display device according to claim 5, wherein the mobile element has a closed annular form, and the marking zone and the portion of interest are each formed by a set of sectors arranged alternately following each other such that two successive characters have a different appearance from one another.

8. The display device according to claim 7, wherein the mobile element includes, on the top surface thereof, an additional sector of different appearance from those forming the marking zone and the portion of interest, said additional sector being inserted between two sectors having a different appearance from the appearance of said additional sector such that the additional sector forms the index.

9. The display device according to claim 8, wherein the sectors between which the additional sector is arranged have a different colour from that of the marking zone and the portion of interest.

10. The display device according to claim 4, comprising an extra thickness on which the marking zone is produced arranged so as to be visible through all of the apertures forming a second set of characters, wherein said extra thickness and the mobile element are arranged adjacently and each have a thickness such that the top surface of said mobile element and the visible surface of said extra thickness extend substantially in the same plane.

11. The display device according to claim 1, comprising an extra thickness on which the marking zone is produced arranged so as to be visible through all of the apertures forming a second set of characters, wherein said extra thickness and the mobile element are arranged adjacently such that the top surface of said mobile element and the visible surface of said extra thickness extend substantially in the same plane, and wherein the mobile element has the form of a lever.

12. The display device according to claim 1, wherein the mobile element comprises two mobile elements, one of the two mobile elements being of a closed annular form having thereon the marking zone and the portion of interest each being formed by a set of sectors arranged alternately following each other such that two successive characters have a different appearance from one another, and the other of the two mobile elements being of the form of a lever on which the portion of interest is formed.

13. The display device according to claim 1, wherein the dial is made of transparent material and includes, on the surface thereof facing inward, an opaque thin coat, the apertures being formed by said thin coat.

* * * * *